UNITED STATES PATENT OFFICE.

GERALD GORDON, OF BOSTON, MASSACHUSETTS.

IMPROVEMENT IN FOOD FOR ANIMALS.

Specification forming part of Letters Patent No. 164,166, dated June 8, 1875; application filed April 17, 1875.

*To all whom it may concern:*

Be it known that I, GERALD GORDON, of Boston, in the county of Suffolk and State of Massachusetts, have invented a new and valuable Improvement in Food for Animals; and I do hereby declare that the following is a full, clear, and exact description of the same.

This invention has relation to food for horses and cattle; and it consists in the combination of the refuse or residuum of brewers' malt after the process of brewing has been completed, and the residuum of palm-nuts after the oil has been extracted, and by such combination producing a valuable, palatable, and nutritious food.

My new animal food is produced as follows, namely: I first take the residuum of brewers' malt and dry it thoroughly in an ordinary kiln or oven, and then grind or pulverize it into fine powder, like oat or corn meal. I then take the residuum of palm-nuts after they have passed through the process of pressing to extract the oil and a drying process, and unite the two materials in the proportion of seventy-five per cent. of brewers' residuum and twenty-five per cent. of the palm-nut residuum by stirring and mixing in any suitable manner.

It should be understood that by my invention two substances which have heretofore been of comparatively small value are utilized to form a substantial and highly nutritious food for animals. In combining the two materials the proportions I have mentioned I believe to be the best that can be used, but they may be varied somewhat and still afford a valuable food.

I am aware that the residuum of brewers' malt has been fed to hogs, and perhaps cattle, and also that the residuum of palm-nuts is not new as animal food; but when uncombined with some preserving substance like oil, brewers' residuum ferments and decomposes with such rapidity that its value is greatly lessened, and the residuum of palm-nuts is too rich for animal food when uncombined with less nutritious substances. By uniting the two in the manner described the malt residuum is preserved from decomposition, and the nut residuum spread through a large mass of matter, rendering it free from the objection above mentioned.

What I claim as new, and desire to secure by Letters Patent, is—

The composition for food for animals, consisting of the residuum of brewers' malt and the residuum of palm-nuts, substantially as described.

In testimony that I claim the above I have hereunto subscribed my name in the presence of two witnesses.

GERALD GORDON.

Witnesses:
GEORGE E. UPHAM,
JNO. B. CORLISS.